INVENTOR
CHARLES D. HIRST
BY Harper Allen
ATTORNEY

June 19, 1956 C. D. HIRST 2,750,797
PROPORTIONAL WATER METER
Filed April 6, 1951 2 Sheets-Sheet 2
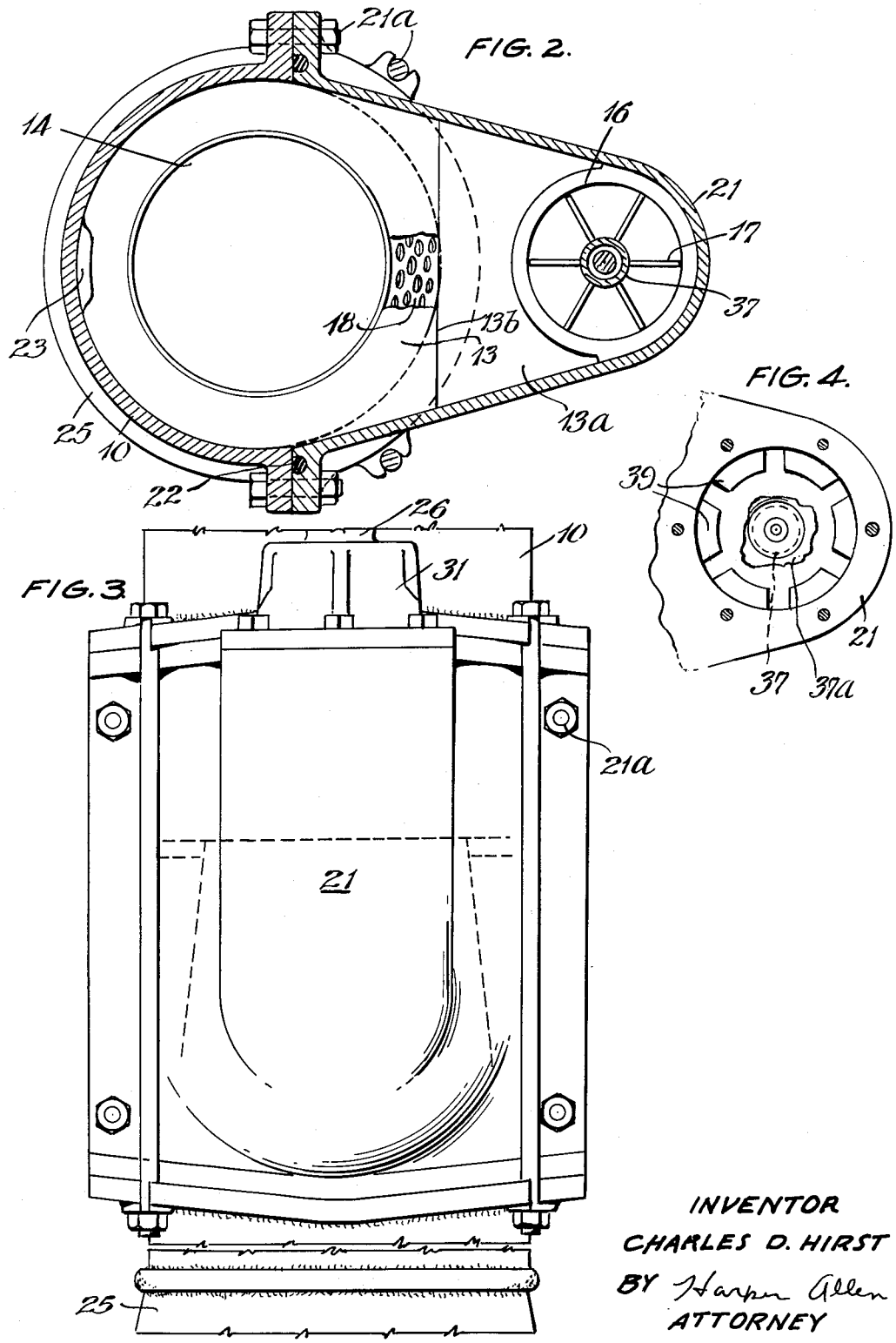
INVENTOR
CHARLES D. HIRST
BY Harper Allen
ATTORNEY

2,750,797

PROPORTIONAL WATER METER

Charles D. Hirst, San Jose, Calif., assignor to The Hersey Mfg. Co., South Boston, Mass., a corporation of Massachusetts Application April 6, 1951, Serial No. 219,665

7 Claims. (Cl. 73—202)

The present invention relates to proportional water meters and is concerned more particularly with an improved construction which is not apt to become clogged because of debris in the water.

It is the general object of the invention to provide a proportional water meter which is constructed to prevent clogging at the metering element by debris in the water.

It is another general object of the invention to provide a proportional water meter having screening means therein to provide a Venturi effect in the region of screening of the proportional flow used for metering.

It is another object of the invention to provide a proportional water meter construction which is of rugged character, easy to assemble, and which will require a minimum of service.

Another object in the invention is to provide a meter construction having means for installing a metering propeller of maximum size.

The above and other objects of the invention are attained as illustrated in a preferred embodiment of the invention, illustrated in the accompanying drawings, in which:

Fig. 2 is a horizontal sectional view, taken in a plane indicated by the line 2—2 in Figure 1.

Fig. 3 is a fragmentary elevational view taken from the right of Figure 1.

Fig. 4 is a fragmentary sectional view taken as indicated by the line 4—4 in Figure 1.

Figure 1:
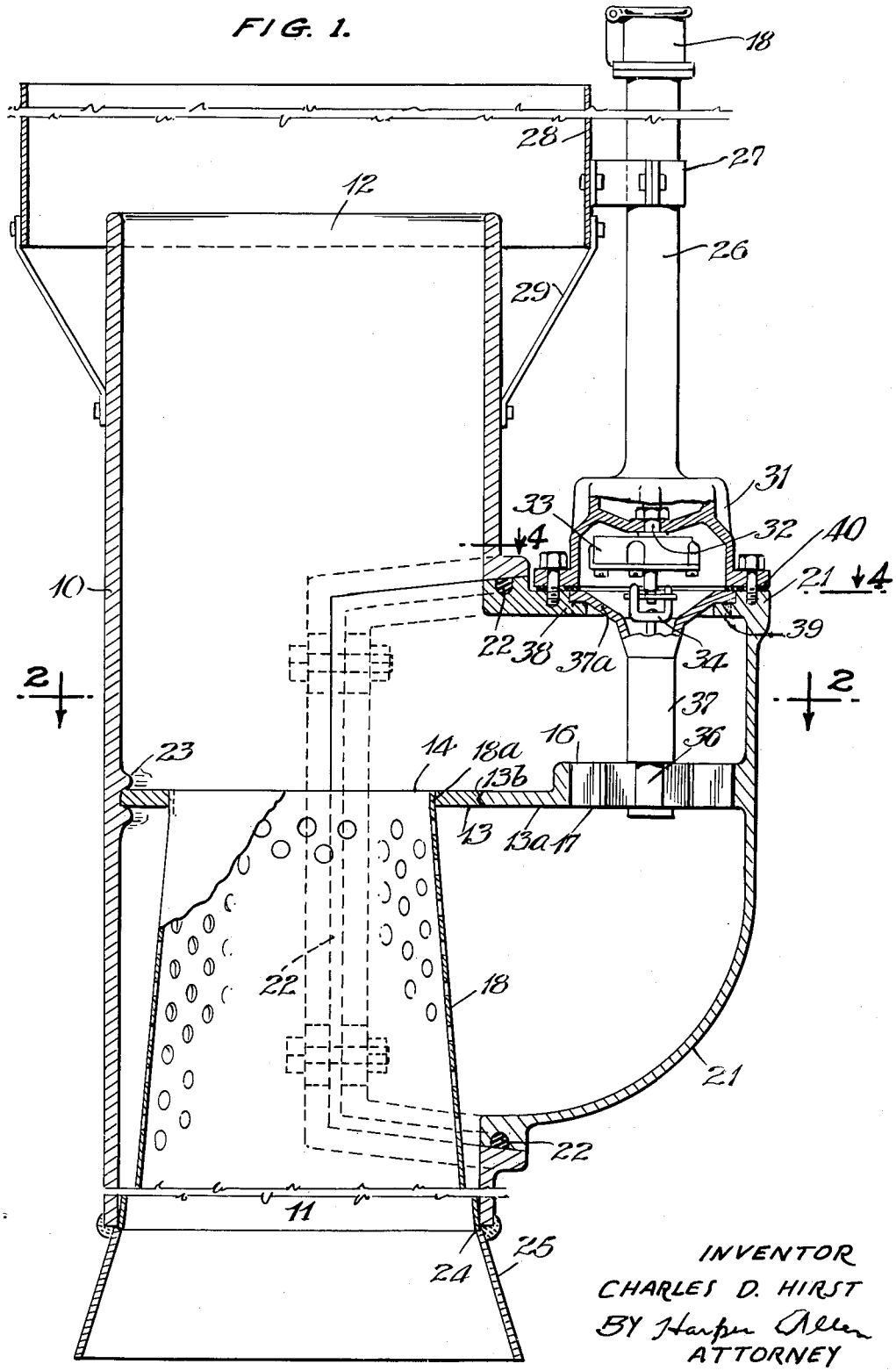
Fig. 1 is a vertical sectional illustrating the proportional meter of the invention.

Referring to the drawings, there is shown a discharge or outlet construction for an irrigating system including a body 10 of steel pipe which is adapted for mounting upon a suitable conduit, such as steel pipe or concrete pipe or other suitable pipe structures. The construction shown provides a vertical mounting of the meter, although the invention as illustrated herein can be employed in a horizontal mounting.

The body 10 is provided with an inlet portion 11 and an outlet portion 12. The division between these inlet and outlet portions is in general provided by an orifice plate structure 13 and 13a containing respective orifices 14 and 16 for the respective flows of water, and impeller 17 being provided in the orifice 16 to meter the flow in a manner later described, and to operate the register 18 for measuring the flow of water. A meter head 21 is mounted in a cutaway portion of the body 10, suitable sealing means 22 being incorporated.

Means are provided for filtering the flow of water to the impeller 17, this means taking the form of a conical screen 18 which also serves as a Venturi member leading to the orifice 14 to obtain a desired accelerated flow of the water to the region where debris might fall or lodge in the metering element per se. Thus it tends to carry debris through the screen, to keep the screen clean, and to provide an accelerated flow immediately above the orifice plate 13 to prevent settling of any debris in this region. The screen 18 is provided at its small end with a straightened portion 18a fitted frictionally within the orifice 14 and at its lower or large end is seated freely on a shoulder 24 of a flange member 25 welded to the lower end of the body 10. The orifice plate 13 is mounted removably within the body 10 and with respect to the head 21, the body 10 being provided with a pair of retaining lugs 23 which may be welded or otherwise secured to the body 10. The plate 13 conforms to the circular outline of the body 10, and projects partially into the head 21. The projecting portion of the plate 13 terminates in a straight edge having a V-shaped recess 13b. The recess 13b engages complementary orifice plate member 13a, cast integrally with the head 21.

When the head 21 is removed by removing its retaining bolts 21a, the orifice plate 13 can be withdrawn carrying with it the screen 18. Similarly during installation the screen 18 and orifice plate 13 are inserted through the opening, the plate 13 is engaged with the lugs or ears 23 and, when the head 21 is installed, the edge of its orifice plate member 13a engages the complementary grooved edge 13b of the plate 13 to complete the assembly.

The register 18 is mounted on a drive housing 26, supported in part by a bracket 27 on a deflector ring 28 supported by plurality of brackets 29 in spaced relation at the discharge end of the body 10. Deflector ring 28 is positioned advantageously to confine and direct the flow of water from the outlet portion 12 to cause it to flow downwardly. At its lower end this housing member is formed integrally with a meter bonnet 31, bolted to the head casting 21. Within the meter bonnet 31 the drive coupling 32 to the register engages a gear train 33 of conventional construction, which is connected through the universal joint 34, with the drive shaft 36 of the impeller 17. Impeller 17 has a suitable journaled mounting in a sleeve 37 formed with a flared upper end 37a having a flange seated in a recessed boss 38 of the head member. The boss 38 is serrated to provide a plurality of locking lugs 39, which are spaced apart to pass the blades of the impeller, and yet provide a stop for the upper end of the mounting sleeve 37. In this manner the impeller 17 can be made of a maximum size for any given head construction. Desirably, a gasket 40 between the bonnet 31 and the boss 38 overlaps the joint between the flange of the flared end 37a and the boss 38.

In operation when the water is flowing upwardly through the body 10 the relative sizes of the apertures 14 and 16 determine the proportion of the water which is metered. Usually from 10 to 20% of the total amount of water will be employed to drive the impeller 17. The amount of water driving the impeller 17 will vary according to the conditions of the metering problem and the amount of 10 to 20% is merely illustrative. By providing a screen in the path of flow of the proportion of water passing the impeller effective insurance against clogging and resultant failure of operation is insured. Also by providing the screen in the form of a Venturi an accelerated flow is provided to maintain the screen in clean condition, and to insure discharge of debris with the flow of water.

While I have shown and described a preferred embodiment of the invention, it is capable of modification and variation therefrom, the scope of the invention therefore should be limited only by the scope of the claims appended hereto.

I claim:

1. In a proportional water meter for measuring a flow of water by metering a fractional part thereof, a hollow body having a fluid inlet opening and an outlet opening, a meter head mounted on and closing an opening into said body, an orifice plate structure dividing said body and said head into an inlet portion and an outlet portion, said plate structure comprising a removable plate seated in said body and a plate portion in said head, there being an aperture in said removable plate in the direct line of flow of liquid through the body and a second aperture in said plate portion out of the direct line of flow, a metering element in said second aperture, and an open-ended tubular screen mounted in said body to receive the entire flow to said inlet portion and leading from the inlet end of said inlet portion to said plate structure and being connected thereto to discharge through said first aperture, said screen filtering water for said metering element.

2. In a proportional water meter for measuring a flow of water by metering a fractional part thereof a hollow body having a fluid inlet opening and an outlet opening, a meter head mounted on and closing an opening into said body, an orifice plate structure dividing said body and said head into an inlet portion and an outlet portion, said plate structure comprising a removable plate seated in said body and a plate portion in said head, there being an aperture in said removable plate in the direct line of flow of liquid through the body and a second aperture in said plate portion out of the direct line of flow, a metering element in said second aperture, and an open-ended frusto-conical screen mounted in said body to receive the entire flow to said inlet portion and leading from the inlet end of said inlet portion to said plate structure and being connected thereto to discharge through said first aperture, said screen filtering water for said metering element.

3. In a proportional water meter for measuring a flow of water by metering a fractional part thereof, a body comprising a water conduit, orifice plate means dividing said water conduit into an entrance portion and an exit portion, said orifice plate means having a first aperture lying in the direct path of flow through said conduit and a second aperture lying out of said direct path, a frusto-conical screen having its small end seated in and discharging through said first aperture of said orifice plate means and its large end positioned at the entrance end of said water conduit to receive the entire inlet flow, whereby the main flow of water passes through said screen to said exit portion of said conduit and a smaller portion is filtered by said screen, and a metering element in the second aperture of said orifice plate means for said smaller portion of liquid.

4. In a proportional water meter for measuring a flow of water by metering a fractional part thereof, a body comprising a water conduit, orifice plate means dividing said water conduit into an entrance portion and an exit portion, said orifice plate means having a first aperture lying in the direct path of flow through said conduit and a second aperture lying out of said direct path, a frusto-conical screen having its small end seated in and discharging through said first aperture of said orifice plate means and its large end positioned at the entrance end of said water conduit to receive the entire inlet flow, whereby the main flow of water passes through said screen to said exit portion of said conduit and a smaller portion is filtered by said screen, a metering element in the second aperture of said orifice plate means, and means at entrance end of said water conduit for positioning the large end of said screen, said last named means overlying the end of the screen to prevent impingement of water thereon.

5. In a proportional water meter for measuring a flow of water by metering a fractional part thereof, a body comprising a pipe, said pipe having a cutaway portion providing a side opening, a meter head mounted in said side opening, an orifice plate structure dividing said body and said head into an inlet portion and an outlet portion, said plate structure comprising a removable plate seated in said body and a plate portion in said head, there being an aperture in said removable plate in the direct line of flow of liquid through said body and a second aperture in said plate portion within said head out of the direct line of flow, a metering element disposed in said second aperture and carried by said head, and an open-ended frusto-conical screen having its large end detachably seated in said inlet portion to receive the entire inlet flow and having its small end engaged with said first aperture to discharge therethrough, said screen filtering a bypass portion of water for said metering element and providing an accelerated flow in the region of said plate structure to insure debris being carried past said region, and a deflector ring mounted about the outlet portion to direct the discharge of water therefrom.

6. In a proportional water meter for measuring a flow of water by metering a fractional part thereof, a body comprising a pipe disposed in upright position, said pipe having a cutaway portion providing a side opening, a meter head mounted in said side opening, an orifice plate structure dividing said body and said head into an inlet portion and an outlet portion, there being an aperture in said plate structure in the direct line of flow of liquid through said body and a second aperture in said plate structure out of the direct line of flow, a metering element disposed in said second aperture and carried by said head, and a tubular screen having its inlet end seated in said inlet portion to receive the entire inlet flow and having its outlet end engaged with said first aperture to discharge therethrough, said screen filtering a bypass portion of water for said metering element and providing an accelerated flow in the region of said plate structure to insure debris being carried past said region, and a deflector ring mounted about the outlet portion to direct the discharge of water therefrom.

7. In a proportional water meter having a hollow body provided with a fluid inlet opening, an outlet opening and a cutaway portion, a meter head mounted on and closing said cutaway portion in the said body, orifice plate means in said body and said head and dividing said body and said head into an inlet portion and an outlet portion, said orifice plate means having a first aperture lying in the direct path of flow through said body and a second aperture lying out of said direct path, an impeller for the meter having a plurality of blades and positioned within said second aperture, said impeller being responsive to liquid flow through said second aperture, and a mounting sleeve for said impeller having a flared end, said head having an apertured boss in alignment with said second aperture to receive said flared end, said apertured boss being serrated to provide for insertion of said impeller and to provide stop-lugs for said mounting sleeve.

References Cited in the file of this patent

UNITED STATES PATENTS

| | | |
|---|---|---|
| 22,315 | Siemens | Dec. 14, 1858 |
| 1,585,255 | McFadden | May 18, 1926 |
| 1,697,840 | Hayes et al. | Jan. 1, 1929 |
| 1,745,005 | Buckner | Jan. 28, 1930 |
| 1,808,210 | Earl | June 2, 1931 |
| 1,918,606 | Lake | July 18, 1933 |
| 1,954,386 | Kidder | Apr. 10, 1934 |
| 1,963,330 | Lumme | June 19, 1934 |
| 2,019,094 | Rice et al. | Oct. 29, 1935 |
| 2,243,252 | Huxford et al. | May 27, 1941 |

FOREIGN PATENTS

| | | |
|---|---|---|
| 1,382 | Great Britain | Nov. 23, 1953 |
| 221,083 | Germany | Apr. 21, 1910 |
| 63,844 | Australia | Mar. 10, 1914 |
| 184,399 | Great Britain | Aug. 17, 1922 |